United States Patent
Siomina et al.

(10) Patent No.: US 9,119,102 B2
(45) Date of Patent: Aug. 25, 2015

(54) RADIO NETWORK NODE AND METHOD FOR USING POSITIONING GAP INDICATION FOR ENHANCING POSITIONING PERFORMANCE

(75) Inventors: Iana Siomina, Solna (SE); Muhammad Kazmi, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 178 days.

(21) Appl. No.: 13/438,305

(22) Filed: Apr. 3, 2012

(65) Prior Publication Data

US 2012/0252487 A1  Oct. 4, 2012

Related U.S. Application Data

(60) Provisional application No. 61/471,303, filed on Apr. 4, 2011.

(51) Int. Cl.
 *H04W 4/00* (2009.01)
 *H04W 64/00* (2009.01)
 *H04W 24/10* (2009.01)
 *G01S 5/02* (2010.01)
 *G01S 5/10* (2006.01)

(52) U.S. Cl.
 CPC ............ *H04W 24/10* (2013.01); *G01S 5/0205* (2013.01); *G01S 5/10* (2013.01); *H04W 64/00* (2013.01)

(58) Field of Classification Search
 CPC ..... H04W 36/30; H04W 36/00; H04W 24/10; H04W 64/00; G01S 5/10; G01S 5/0205
 USPC .................. 455/456.1–456.6, 67.11; 370/252
 See application file for complete search history.

(56) References Cited

U.S. PATENT DOCUMENTS

| | | | |
|---|---|---|---|
| 8,908,648 B2 * | 12/2014 | Chin et al. .................... | 370/332 |
| 2010/0273506 A1 | 10/2010 | Stern-Berkowitz et al. | |
| 2011/0039577 A1 * | 2/2011 | Stern-Berkowitz et al. ......................... | 455/456.1 |
| 2012/0015667 A1 * | 1/2012 | Woo et al. .................. | 455/456.1 |
| 2012/0051258 A1 * | 3/2012 | Josso ............................ | 370/252 |
| 2012/0083221 A1 * | 4/2012 | Ranta-Aho et al. ......... | 455/67.11 |
| 2012/0083278 A1 * | 4/2012 | Kazmi et al. ................. | 455/440 |
| 2012/0163346 A1 * | 6/2012 | Chin et al. .................... | 370/335 |
| 2012/0184290 A1 | 7/2012 | Kazmi et al. | |
| 2012/0190373 A1 * | 7/2012 | Tenny .......................... | 455/447 |

(Continued)

FOREIGN PATENT DOCUMENTS

WO  WO 2011/142710 A1  11/2011
WO  WO 2011/142715 A1  11/2011

OTHER PUBLICATIONS

Catt et al, "Measurement gap configuration for inter-freq RSTD measurement." 3GPP, Moble Competence Centre, Mar. 6, 2011. Tapel Taiwan. XP050494114.*

(Continued)

*Primary Examiner* — Khawar Iqbal

(57) ABSTRACT

A wireless communications network is described herein in which positioning measurements (e.g., inter-frequency OTDOA measurements and inter-frequency E-CID measurements) may be performed on different frequencies and measurement gaps may be requested for such measurements. In one embodiment, a radio network node (e.g., eNodeB, responsible node) is described for configuring a measurement gap for positioning to be used by a user equipment (UE).

45 Claims, 6 Drawing Sheets

(56) References Cited

U.S. PATENT DOCUMENTS

2013/0059610 A1* 3/2013 Siomina et al. ............ 455/456.6
2014/0094188 A1* 4/2014 Kazmi et al. ............... 455/456.1

OTHER PUBLICATIONS

Ericsson et al, "Measurement gap configuration for inter-freq RSTD measurement," 3GPP, Mobile Competence Centre, Nov. 9, 2010, Jacksonville, Flordia USA, XP050467156.

Catt et al "Introduction of OTDOA inter-freq RSTD measurement indication procedure," 3GPP, Mobile Competence Centre, Mar. 6, 2011, Taipel, Taiwan, XP050494114.

Nokia "Concept Proposal for LCS in GPRS," 3GPP, Mobile Competence Centre, Mar. 12, 2000, Tokyo, Japan, XP050233044.

3GPP TS 36.355 V10 1.0 (Mar. 2011) 3rd Generation Partnership Project; Technical Specification Group Radio Access Network; Evolved Universal Terrestrial Radio Access (E-UTRA): LTE Positioning Protocol (LPP) (Release 10).

ETSI TS 136 331 V10 1.0 (Apr. 2011) LTE: Evolved Universal Terrestrial Radio Access (E-UTRA); Radio Resource Control (RRC); Protocol specification (3GPP TS 36.331 version 10.1.0 Release 10).

ETSI TS 136 133 V10.1.0 (Jan. 2011) LTE; Evolved Universal Terrestrial Radio Access (E-UTRA); Requirements for support of radio resource management (3GPP TS 36.133 version 10.1.0 Release 10).

* cited by examiner

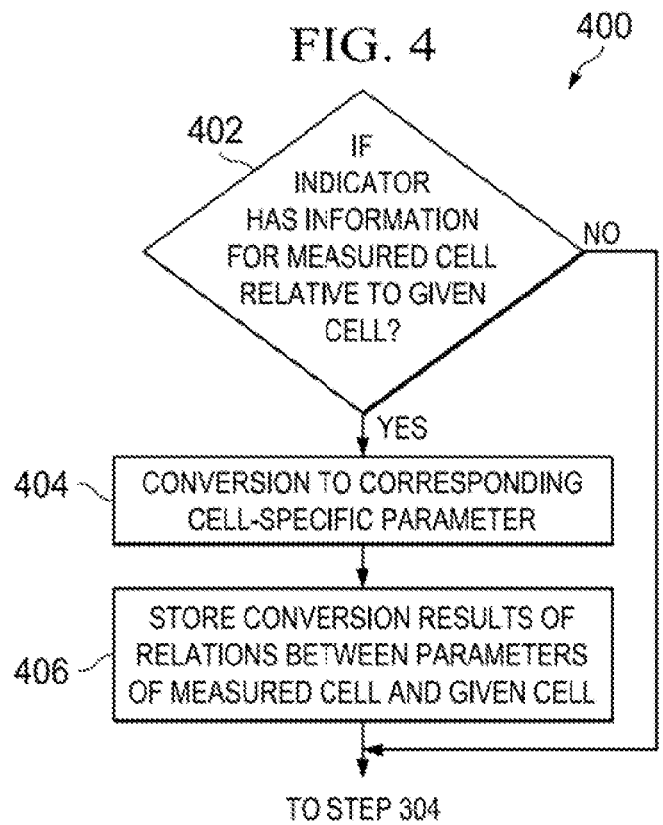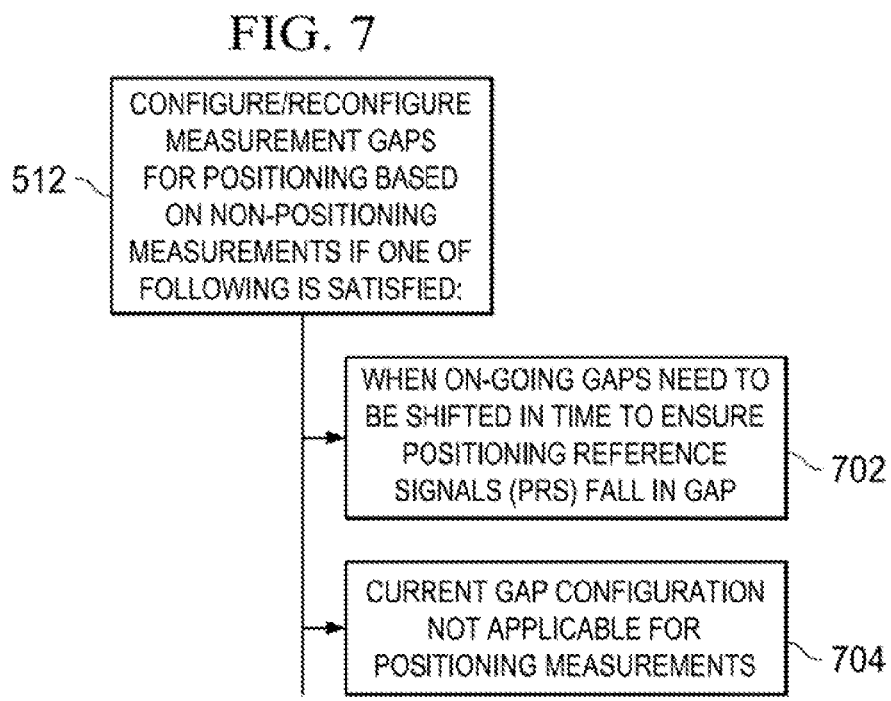

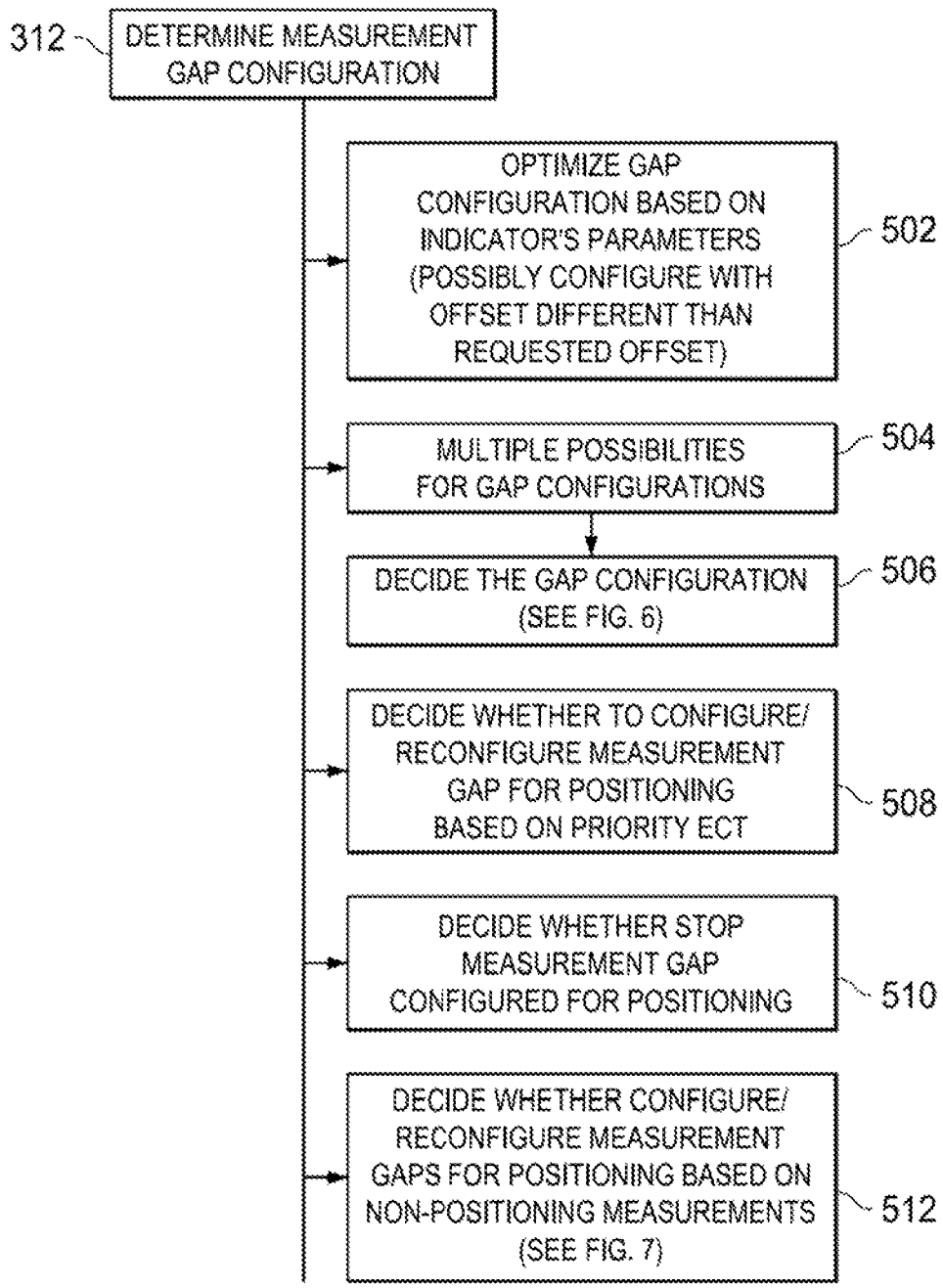

RADIO NETWORK NODE AND METHOD FOR USING POSITIONING GAP INDICATION FOR ENHANCING POSITIONING PERFORMANCE

CLAIM OF PRIORITY

This application claims the benefit of U.S. Provisional Application Ser. No. 61/471,303 filed on Apr. 4, 2011. The contents of this document are hereby incorporated by reference herein.

TECHNICAL FIELD

The present invention relates to a wireless communications network in which positioning measurements (e.g., inter-frequency OTDOA measurements or inter-frequency E-CID measurements) may be performed on different frequencies and measurement gaps may be requested for such measurements. In one embodiment, a radio network node (e.g., eNodeB, responsible node) is described for configuring a measurement gap for positioning to be used by a user equipment (UE).

BACKGROUND

The following abbreviations are herewith defined, at least some of which are referred to within the following description about the prior art and the present invention.
3GPP 3$^{rd}$ Generation Partnership Project
AECID Adaptive E-CID
A-GNSS Assisted-GNSS
A-GPS Assisted-GPS
ANR Automatic Neighbor Relation
AoA Angle-of-Arrival
BS Base Station
CDMA Code Division Multiple Access
CQI Channel Quality Indicator
CRS Cell Specific Reference Signals
DRX Discontinuous Reception
E-CID Enhanced Cell Identification
eICIC Enhanced Inter-cell Interference Coordination
eNodeB Evolved Node B
E-SMLC Evolved SMLC
E-UTRAN Evolved UTRAN
GMLC Gateway Mobile Location Centre
GNSS Global Navigational Satellite System
GPS Global Positioning System
GSM Global System for Mobile Communications
LBS Location-Based Service
LCS Location Services
LPP LTE Positioning Protocol
LPPa LPP Annex
LTE Long-Term Evolution
MDT Minimization of Drive Tests
MME Mobile Management Entity
MST Multi-Standard Radio
O & M Operations & Maintenance
OMA Open Mobile Alliance
OTDOA Observed Time Difference of Arrival
PCI Physical Cell Identity
PDN GW Packet Data Network Gateway
P-GW Packet-Gateway
PRS Positioning Reference Signal
RAN Radio Access Network
RAT Radio Access Technology
RB Resource Block
RRC Radio Resource Control
RRM Radio Resource Management
RS Reference Signal
RSRP Reference Signal Received Power
RSRQ Reference Signal Received Quality
RSSI Received Signal Strength Indicator
RSTD Reference Signal Time Difference
S-GW Serving-Gateway
SLP SUPL Location Platform
SLC SUPL Location Center
SMLC Serving Mobile Location Center
SON Self Organizing Network
SPC Signalling Point Code
SUPL Secure User Plane Location
TA Timing Advance
UE User Equipment
UMTS Universal Mobile Telecommunications System
UTDOA Uplink Time Difference Of Arrival
UTRA Universal Terrestrial Radio Access
WCDMA Wideband Code Division Multiple Access The possibility of identifying the geographical location of a user (e.g., wireless terminal, UE) in a telecommunications network has enabled a large variety of commercial and non-commercial services, e.g., navigation assistance, social networking, location-aware advertising, emergency calls, etc. Different services may have different positioning accuracy requirements which are imposed by the application. In addition, some regulatory requirements on the positioning accuracy for basic emergency services exist in some countries, i.e. FCC E911 in US.

In many environments, the position of the wireless terminal can be accurately estimated by using positioning methods based on GPS (Global Positioning System). Nowadays, telecommunication networks often have a possibility to assist UEs in order to improve the terminal receiver sensitivity and GPS start-up performance (Assisted-GPS positioning, or A-GPS). GPS or A-GPS receivers, however, may not necessarily be available in all wireless terminals. Furthermore, GPS is known to often fail in indoor environments and urban canyons. Thus, a complementary terrestrial positioning method, called Observed Time Difference of Arrival (OTDOA), has been standardized by 3GPP. In addition to OTDOA, the LTE standard also specifies methods, procedures and signaling support for Enhanced Cell ID (E-CID) and A-GNSS. Plus, a positioning method known as Uplink Time Difference Of Arrival (UTDOA) is also being standardized for LTE.

1. Positioning in LTE

The three key network elements in an LTE positioning architecture are the LCS Client, the LCS target device (e.g., terminal) and the LCS Server. The LCS Server is a physical or logical entity that manages positioning for the LCS target device by collecting measurements and other location information, assisting the terminal in measurements when necessary, and estimating the LCS target location. The LCS Client is a software and/or hardware entity that interacts with the LCS Server for the purpose of obtaining location information for one or more LCS target devices, i.e. the entities being positioned. The LCS Client may reside in the LCS target device itself. The LCS Client sends a request to the LCS Server to obtain location information, and the LCS Server processes and serves the received request and sends the positioning result and optionally a velocity estimate to the LCS Client. A positioning request can be originated from the terminal or the network.

The position calculation can be conducted, for example, by the LTE's LCS server (e.g., E-SMLC or SLP) or by the UE.

The former approach corresponds to what is known as the UE-assisted positioning mode, while the latter approach corresponds to what is known as the UE-based positioning mode.

The LTE currently supports two positioning protocols namely LPP and LPPa which operate via the radio network. The LPP is a point-to-point protocol between the LCS Server and the LCS target device, used in order to position the target device. LPP can be used both in the user and control plane, and multiple LPP procedures are allowed in series and/or in parallel thereby reducing latency. LPPa is a protocol between the eNodeB and the LCS Server and is specified only for control-plane positioning procedures, although it still can assist user-plane positioning by querying eNodeBs for information and eNodeB measurements. In this case, the SUPL protocol can be used as a transport for LPP in the user plane. The LPP also has a possibility to convey LPP extension messages inside LPP messages, e.g., currently OMA LPP extensions are being specified (LPPe) to allow, e.g., for operator- or manufacturer-specific assistance data or assistance data that cannot be provided with LPP or to support other position reporting formats or new positioning methods. The LPPe may also be embedded into messages of other positioning protocol, which is not necessarily LPP.

A high-level architecture of a radio network 100, as it is currently standardized in LTE, is illustrated in FIG. 1 (PRIOR ART), where the LCS target is a terminal 102, and the LCS Server is an E-SMLC 104 or an SLP 106. In this figure, the control plane positioning protocols with the E-SMLC 104 as the terminating point are LPP, LPPa and LCS-AP, and the user plane positioning protocol is SUPL and SUPL/LPP. The SLP 106 may comprise two components SPC 108 and SLC 110 which may also reside in different nodes. In an example implementation, the SPC 108 has a proprietary interface with the E-SMLC 104, and an LLP interface with the SLC 110 while the SLC 110 communicates with a P-GW 112 (PDN-Gateway 112) and an external LCS Client 114. One skilled in the art will recognize and understand this high-level architecture of the radio network 100 including the eNodeB 116, the GMLC 118, the MME 120, the S-GW 122, the RAN 126, and the core network 128. Additional positioning architecture elements may also be deployed to further enhance performance of specific positioning methods. For example, deploying radio beacons 130 (two shown) is a cost-efficient solution which may significantly improve positioning performance indoors and also outdoors by allowing more accurate positioning, for example, with proximity location techniques.

2. Positioning Methods

To meet LBS demands, the LTE network deploys a range of complementing positioning methods characterized by having different performances in different environments. Depending on where the measurements are conducted and the final position is calculated, the positioning methods can be UE-based, UE-assisted or network-based, each with their own advantages. The following positioning methods are available in the LTE standard for both the control plane and the user plane:

Cell ID (CID),

UE-assisted and network-based E-CID, including network-based angle of arrival (AoA), UE-based and UE-assisted A-GNSS (including A-GPS), UE-assisted Observed Time Difference of Arrival (OTDOA).

Hybrid positioning, fingerprinting positioning/pattern matching and adaptive E-CID (AECID) do not require additional standardization and are therefore also possible to be implemented in the LTE network. Furthermore, there may also be UE-based versions of the positioning methods above, e.g. UE-based GNSS (e.g. GPS) or UE-based OTDOA, etc.

There may also be some alternative positioning methods such as proximity based location. UTDOA may also be standardized in a later LTE release, since it is currently under discussion in 3GPP. More methods, LTE and non-LTE, are supported with LPPe. Similar positioning methods, which may have different names, also exist in other RATs, e.g., CDMA, WCDMA or GSM.

2.1 E-CID Positioning

The E-CID positioning method exploits the advantage of low-complexity and fast positioning with CID which exploits the network knowledge of geographical areas associated with cell IDs, but enhances positioning further with more measurement types. With Enhanced Cell ID (E-CID), the following sources of position information are involved: the Cell Identification (CID) and the corresponding geographical description of the serving cell, the Timing Advance (TA) of the serving cell, and the CIDs and the corresponding signal measurements of the cells (up to 32 cells in LTE, including the serving cell), as well as AoA measurements. The following UE measurements can be utilized for E-CID in LTE: (1) E-UTRAN carrier Received Signal Strength Indicator (RSSI); (2) Reference Signal Received Power (RSRP); (3) Reference Signal Received Quality (RSRQ); and (4) UE Rx-Tx time difference. The E-UTRAN measurements available for E-CID are eNodeB Rx-Tx time difference (also called TA Type 2), TA Type 1 being (eNodeB Rx-Tx time difference)+(UE Rx-Tx time difference), and UL AoA. The UE Rx-Tx measurements are typically used for the serving cell, while e.g. RSRP and RSRQ as well AoA can be utilized for any cell and can also be conducted on a frequency different from that of the serving cell. The UE E-CID measurements are reported by the UE 102 to the positioning server (e.g. Evolved SMLC, or E-SMLC 104, or SUPL Location Platform, or SLP 106, in LTE) over the LTE Positioning Protocol (LPP), and the E-UTRAN E-CID measurements are reported by the eNodeB 116 to the positioning server 104 over the LPP Annex protocol (LPPa). The UE 102 may receive assistance data from the network e.g. via LPPe (no LPP assistance for E-CID is currently specified in the standard, however, it may be sent via LPP extension protocol, LPPe).

2.2 OTDOA Positioning

The OTDOA positioning method makes use of the measured timing of downlink signals received from multiple eNodeBs 116 (one shown in FIG. 1) at the UE 102. The UE 102 measures the timing of the received signals using assistance data received from the LCS server 104 and 106, and the resulting measurements are used to locate the UE 102 in relation to the neighbouring eNodeBs 116.

In the OTDOA positioning method, the terminal 102 (UE 102) measures the timing differences for downlink reference signals received from multiple distinct locations. For each (measured) neighbor cell, the UE 102 measures Reference Signal Time Difference (RSTD) which is the relative timing difference between neighbor cell and the reference cell. The UE position estimate is then found as the intersection of hyperbolas corresponding to the measured RSTDs. At least three measurements from geographically dispersed base stations (eNodeBs 116) with a good geometry are needed to solve for two coordinates of the terminal 102 and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP.

The PRS are transmitted from one antenna port (R6) according to a pre-defined pattern. A frequency shift, which is a function of Physical Cell Identity (PCI), can be applied to the specified PRS patterns to generate orthogonal patterns and modeling the effective frequency reuse of six, which makes it possible to significantly reduce neighbour cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) may also be used for positioning measurements.

The PRS are transmitted in pre-defined positioning subframes grouped by several consecutive subframes ($N_{PRS}$), i.e. one positioning occasion. Positioning occasions occur periodically with a certain periodicity of N subframes, i.e. the time interval between two positioning occasions. The standardized periods N are 160, 320, 640, and 1280 ms, and the number of consecutive subframes may be 1, 2, 4, or 6.

3. Inter-Frequency, Inter-Band and Inter-Rat Measurements

It is mandatory for all UEs to support all intra-RAT measurements (i.e. inter-frequency and intra-band measurements) and meet the associated requirements. However the inter-band and inter-RAT measurements are UE capabilities, which are reported to the network during the call setup. The UE supporting certain inter-RAT measurements should meet the corresponding requirements. For example a UE supporting LTE and WCDMA should support intra-LTE measurements, intra-WCDMA measurements and inter-RAT measurements (i.e. measuring WCDMA when serving cell is LTE and measuring LTE when serving cell is WCDMA). Hence, the network can use these capabilities according to its strategy. These capabilities are highly driven by factors such as market demand, cost, typical network deployment scenarios, frequency allocation, etc. The UE 102 may also report specifically for the positioning purpose, e.g. upon a network request, the set of supported frequency bands.

3.1 Inter-Frequency Measurements

Inter-frequency measurements may in principle be considered for any positioning method, even though currently not all measurements are specified by the standard as intra- and inter-frequency measurements. The examples of inter-frequency measurements currently specified by the standard are Reference Signal Time Difference (RSTD) used for OTDOA, RSRP and RSRQ which may be used e.g. for fingerprinting or E-CID. There are, however, no requirements for inter-frequency E-CID measurements.

The UE performs inter-frequency and inter-RAT measurements in measurement gaps. The measurements may be done for various purposes: mobility, positioning, self organizing network (SON), minimization of drive tests etc. Furthermore the same gap pattern is used for all types of inter-frequency and inter-RAT measurements. Therefore, E-UTRAN must provide a single measurement gap pattern with constant gap duration for concurrent monitoring (i.e. cell detection and measurements) of all frequency layers and RATs.

In LTE, the measurement gaps are configured by the network to enable measurements on the other LTE frequencies and/or other RATs (e.g. UTRA, GSM, CDMA2000, etc). The gap configuration is signaled to the UE over RRC protocol as part of the measurement configuration. If the UE requires measurement gaps for OTDOA positioning measurements then it may send an indication to the network, e.g. eNodeB, upon which the network may configure the measurement gaps. Furthermore, the measurement gaps may need to be configured according to a certain rule, e.g. inter-frequency RSTD measurements for OTDOA require that the measurement gaps are configured according to the inter-frequency requirements in 3GPP 36.133, Section 8.1.2.6, release 9 version 9.4.0 (2010-06), e.g. gap pattern #0 shall be used when inter-frequency RSTD measurements are configured and there should not be measurement gaps overlapping with PRS occasions of cells in the serving frequency.

3.2 Inter-RAT Measurements

In general, in LTE the inter-RAT measurements are typically defined similar to inter-frequency measurements, e.g. they may also require configuring measurement gaps like for inter-frequency measurements, but just with more measurements restrictions and often more relaxed requirements for inter-RAT measurements. As a special example, there may also be multiple networks using the overlapping sets of RATs. The examples of inter-RAT measurements specified currently for LTE are UTRA FDD Common Pilot Channel (CPICH) Received Signal Code Power (RSCP), UTRA FDD carrier RSSI, UTRA FDD CPICH Ec/No, GSM carrier RSSI, and CDMA2000 1xRTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node (e.g. E-SMLC in LTE).

Inter-RAT positioning measurement reporting may be possible with LPPe. However, for UEs requiring measurement gaps the current standard does not allow configuring the gaps for other than inter-frequency RSTD measurements.

3.3 Inter-Band Measurements

An inter-band measurement refers to the measurement done by the UE on a target cell on the carrier frequency belonging to the frequency band which is different than that of the serving cell. Both inter-frequency and inter-RAT measurements can be intra-band or inter-band.

The motivation of inter-band measurements is that most of the UEs today support multiple bands even for the same technology. This is driven by the interest from service providers; a single service provider may own carriers in different bands and would like to make efficient use of carriers by performing load balancing on different carriers. A well known example is that of multi-band GSM terminal with 800/900/1800/1900 bands.

Furthermore, the UE may also support multiple technologies e.g. GSM, UTRA FDD and E-UTRAN FDD. Since all UTRA and E-UTRA bands are common, the multi-RAT UE may support same bands for all the supported RATs.

4. Positioning Measurement Requirements in LTE

For E-CID, there are intra-frequency UE Rx-Tx accuracy and reporting delay requirements. No inter-frequency requirements are currently defined for E-CID measurements.

OTDOA uses RSTD measurements performed by the UE. For UE-assisted OTDOA, i.e., when the UE reports the measurements to the positioning node (e.g., E-SMLC), the following requirements have been defined:

Intra-frequency RSTD accuracy requirements,
Inter-frequency RSTD accuracy requirements,
Intra-frequency RSTD reporting delay requirements for FDD,
Intra-frequency RSTD reporting delay requirements for TDD, Inter-frequency RSTD reporting delay requirements for FDD-FDD,
Inter-frequency RSTD reporting delay requirements for TDD-FDD,
Inter-frequency RSTD reporting delay requirements for TDD-TDD,
Inter-frequency RSTD reporting delay requirements for FDD-TDD.

For each of the inter-frequency requirements, two scenarios are considered:

Scenario 1: inter-frequency RSTD measurements are performed over the reference cell and neighbour cells, which belong to the inter-frequency carrier frequency f2.

Scenario 2: inter-frequency RSTD measurements are performed over the reference cell and the neighbour cells, which belong to the serving carrier frequency f1 and the inter-frequency carrier frequency f2, respectively.

Scenario 1 corresponds to Note 1 in, e.g., Table 8.1.2.6.1-1 of the aforementioned 3GPP 36.133 standard, while Scenario 2 corresponds to Note 2 in the same table.

The requirements are generic with respect to the frequency channels and frequency bands, to i.e. the requirements are the same for any two different f1 and f2, independently on their absolute and relative location in the spectrum, e.g., being common for inter-frequency intra-band and inter-band. This generic approach with regard to the frequency channels and bands has been used for the specification of the other measurement requirements e.g. mobility measurement requirements such as RSRP and RSRQ in LTE. Note also that the requirements are currently common for inter-frequency. Furthermore, there may also be inter-RAT measurements, e.g., a UE connected to CDMA is performing LTE RSTD measurements.

To ensure that the positioning requirements are met, test cases have been specified by the standard, based on which the UEs are tested. The currently specified positioning test cases assume that the timing information for at least one cell (serving cell) in the assistance data is known to the UE, i.e., the UEs in the tests are not required to acquire the timing information of any of the cells. In these tests, the UE is required to report the positioning measurements (i.e. RSTD) within the test requirements. Failure to do so shall lead to the failure of the test. Hence, if prior to the start of the actual test the UE under test does not have the timing information of any of the cells to be measured for positioning, then it is quite likely that the UE will fail the test.

SUMMARY

A radio network node, a method for configuring a measurement gap for positioning, and a UE are described in the independent claims of the present application. Advantageous embodiments of radio network node, the method for configuring a measurement gap for positioning, and the UE have been described in the dependent claims of the present application.

In particular embodiments, a radio network node is provided for configuring a measurement gap for positioning to be used by a user equipment (UE). The radio network node comprises: (a) a processor; and (b) a memory that stores processor-executable instructions where the processor interfaces with the memory and executes the processor-executable instructions to enable following: (i) receive an indication indicating that the UE needs measurement gaps for positioning; (ii) verify parameters in the indication to determine if one or more pre-defined conditions are met to indicate that the UE is able to perform inter-frequency positioning measurements; (iii) decide on whether to configure the measurement gaps; and (iv) if decided to configure the measurement gaps then determine measurement gap configuration and send the measurement gap configuration to the UE.

In yet other embodiments, a method is provided to be implemented by a radio network node for configuring a measurement gap for performing at least one positioning measurement to be used by a user equipment (UE). The method comprising the steps of: (a) receiving an indication indicating that the UE needs measurement gaps for positioning; (b) verifying parameters in the indication to determine if one or more pre-defined conditions are met to indicate that the UE is able to perform inter-frequency positioning measurements; (c) deciding on whether to configure the measurement gaps; and (d) if decided to configure the measurement gaps then determining measurement gap configuration and sending the measurement gap configuration to the UE.

In yet other embodiments, a user equipment is provided that comprises: (a) a processor; and (b) a memory that stores processor-executable instructions where the processor interfaces with the memory and executes the processor-executable instructions to enable following: (i) sending, to a radio network node, an indication indicating a need for measurement gaps for positioning; and (ii) receiving, from the radio network node, measurement gap configuration. The indication comprises one or more of the following parameters: a need indication; measurement gap purpose; one or more frequencies; one or more offsets indicating an occurrence of measurements that require measurement gaps; one or more pairs of a frequency and the corresponding offset for that frequency; periodicity of measurements that require measurement gaps or a preferred measurement gap pattern; cell identifications; radio access technology (RAT); type of service or session; emergency indication; and overall duration over which the measurement gaps are required.

In still yet other embodiments, a user equipment is provided that comprises: (a) a processor; and (b) a memory that stores processor-executable instructions where the processor interfaces with the memory and executes the processor-executable instructions to enable following: (i) configure autonomous gaps for positioning measurements based on a pre-defined rule or for a group of gap-assistant positioning measurements.

Additional aspects of particular embodiments of the described solutions will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of particular embodiments of the proposed solutions may be obtained by reference to the following detailed description when taken in conjunction with the accompanying drawings:

FIG. 4 is a flowchart illustrating the steps associated with a receive indicator step of the method shown in FIG. 3 in accordance to an embodiment of the present invention;

FIG. 5 is a flowchart illustrating the steps associated with a determined measurement gap configuration step of the method shown in FIG. 3 in accordance to an embodiment of the present invention;

FIG. 7 is a flowchart illustrating the steps associated with a decide measurement gap configuration based on non-positioning measurements step of the method shown in FIG. 5 in accordance to an embodiment of the present invention.

DETAILED DESCRIPTION

At least the following problems have been identified by the inventors with the positioning methods described above:
Methods and rules for verifying parameters included in the measurement gap indication message may be desirable to ensure the proper usage of measurement to gaps.
The measurement gap indication message may contain multiple parameters which may indicate the need for different gap configurations.
Methods for resolving such parameter conflict situations are necessary.
Measurement gaps may be used for other purposes than positioning, so the network may decide to not configure/reconfigure measurement gaps.
There are currently no criteria or requirements for deciding whether gaps for positioning must be configured/reconfigured, which may negatively impact emergency positioning.
There are requirements on inter-frequency positioning measurements, but there are no requirements on the network for measurement gap configuration and there is no possibility for UEs to use autonomous gaps for positioning.
Currently measurement gap configuration is controlled by eNodeBs, except for autonomous gaps decided by UEs that are, however, not allowed for positioning,
Delayed measurement gap configuration/reconfiguration (e.g. to ensure measurement occasions are covered by the gaps) will impact the measurement accuracy (the UE may move) and the positioning measurement reporting time, which will degrade the positioning QoS.

Accordingly, there has been and is a need to address these problems and other problems to enhance the performance of determining a position of a terminal (e.g., UE). These needs and other needs are satisfied by particular embodiments of the solutions described herein.

Figure 1:
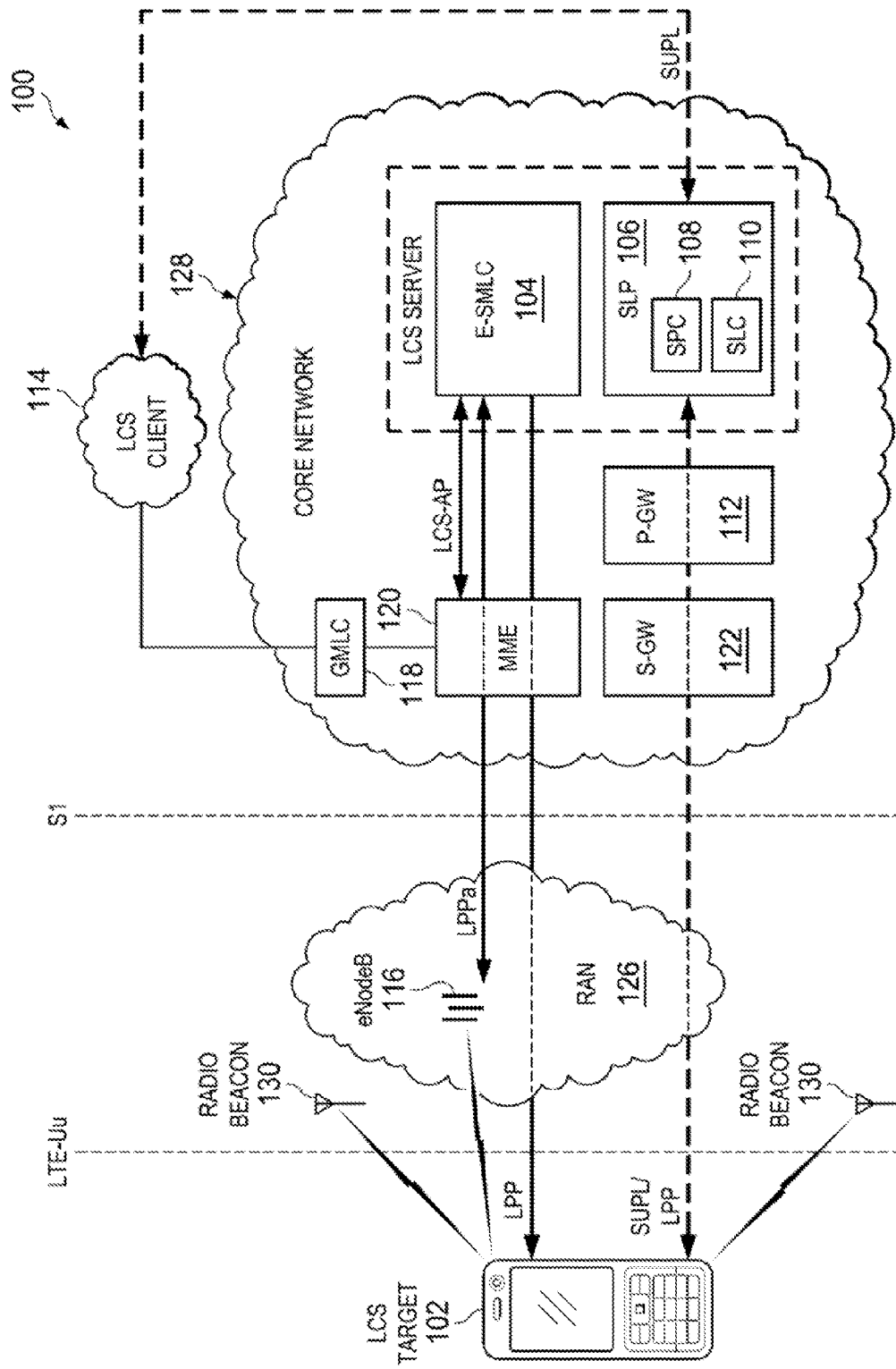
FIG. 1 (PRIOR ART) is a high-level architecture of a radio network as it is currently standardized in LTE.
Figure 2:
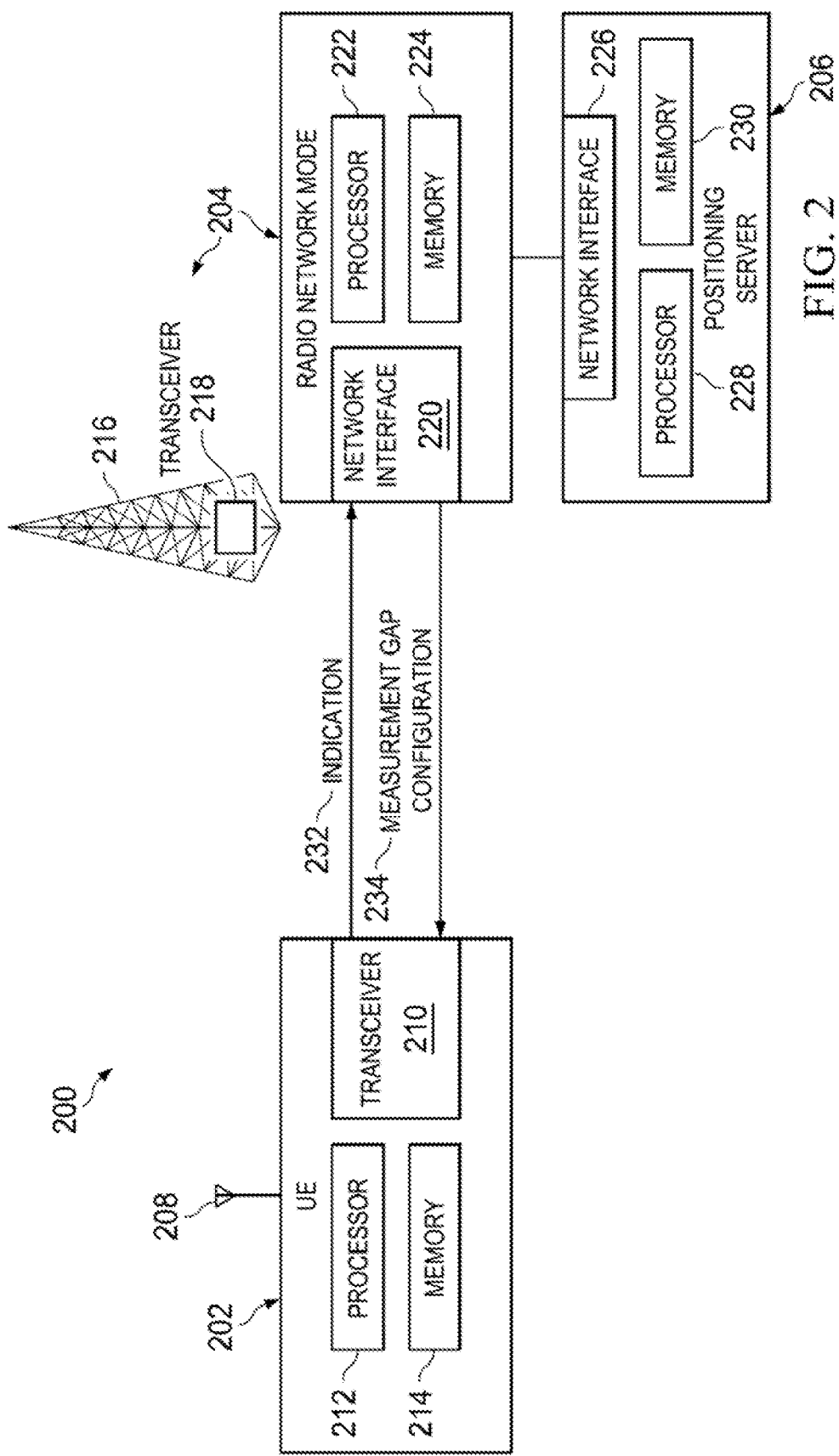
FIG. 2 is a diagram of an exemplary network including a UE, a radio network node (e.g., base station, eNodeB) and a positioning server (e.g., LTE's E-SMLC/SLP) configured in accordance with an embodiment of the present invention.

Accordingly, FIG. 2 shows a diagram of an exemplary network 200 including a UE 202, a radio network node 204 (e.g., base station 204, eNodeB 204) and a positioning server 206 (e.g., LTE's E-SMLC/SLP 206) configured in accordance with an embodiment of the present invention. The example network 200 may include one or more instances of the UE 202, one or more radio network nodes 204 capable of communicating with the UEs 202, and the positioning server 206 (e.g., represented collectively by an E-SMLC and SLP) capable of communicating with the radio network nodes 204, along with any additional elements suitable to support communication between UEs 202 or between one UE 202 and another communication device (such as a landline telephone). Although the UE 202 may represent a communication device that includes any suitable combination of hardware and/or software, the UE 202 may, in particular embodiments, represent a device such as the illustrated exemplary UE 202 which includes an antenna 208, a transceiver 210, a processor 212, and a memory 214. Additionally, the radio network node 204 may include any suitable combination of hardware and/or software, where the illustrated exemplary radio network node 204 includes an antenna 216, a transceiver 218, a network interface 220, a processor 222, and a memory 224. Similarly, although the positioning server 206 may represent one or more network nodes that include any suitable combination of hardware and/or software, the positioning server 206 may, in particular embodiments, represent devices such as the illustrated exemplary positioning server 206 which includes a network interface 226, a processor 228, and a memory 230. In one embodiment, the UE 202, the radio network node 204 and the positioning server 206 could be incorporated within and enhance the LTE network 100 shown in FIG. 1. The UE 202, the radio network node 204, and the positioning server 206 all include additional components and functionalities that are well known in the art but for clarity only the components and functionality needed to describe and enable the present invention have been described herein.

Figure 3:
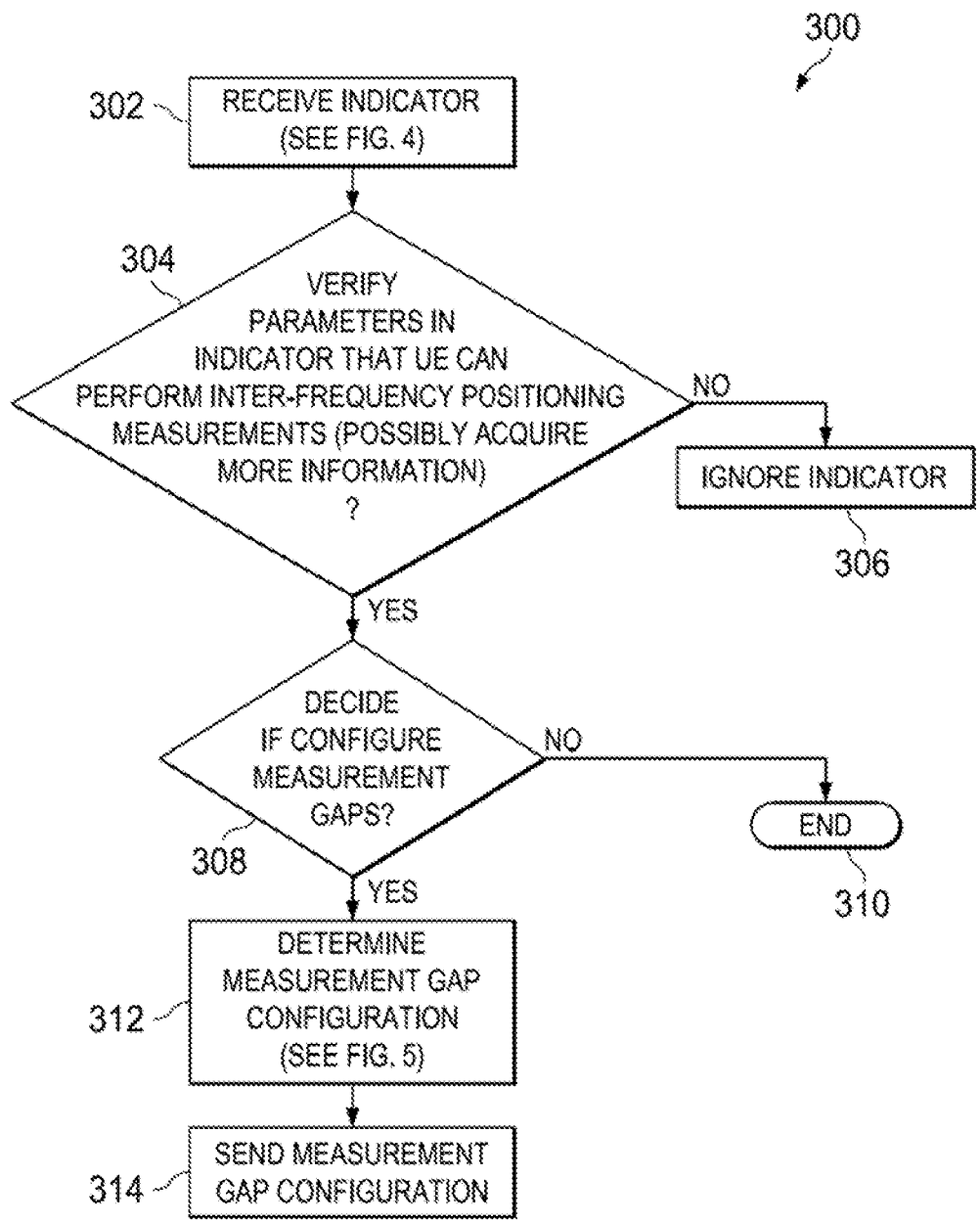
FIG. 3 is a flowchart illustrating the steps of an exemplary method that is implemented the radio network node to configure a measurement gap for positioning to be used by the UE in accordance to an embodiment of the present invention.

Referring to FIG. 3, there is a flowchart illustrating the steps of an exemplary method 300 that is implemented by the radio network node 204 to configure a measurement gap for positioning to be used by the UE 202 in accordance to an embodiment of the present invention. The radio network node 204 includes the processor 212 and the memory 214 that stores processor-executable instructions where the processor 212 interfaces with the memory 214 and executes the processor-executable instructions to enable following steps: (1) receive an indication 232 indicating that the UE 202 needs measurement gaps for positioning (step 302—see also FIG. 4); (2) verify parameters in the indication 232 to determine if one or more pre-defined to conditions are met to indicate that the UE 202 is able to perform inter-frequency positioning measurements (step 304); (3) if the UE 202 is not able to perform inter-frequency positioning, measurements, then acquire more information or ignore the indication 232 (step 306); (4) if the UE 202 is able to perform inter-frequency positioning measurements, then decide on whether to configure the measurement gaps (step 308); (5) if decided not to configure the measurement gaps, then end (step 310); (6) if decided to configure the measurement gaps then determine a measurement gap configuration 234 (step 312—see also FIG. 5); and (7) send the measurement gap configuration 234 to the UE 202 (step 314). A detailed discussion about each of these steps 302, 304, 306, 308, 310, 312 and 312 is provided next.

1. RECEIVE INDICATION 232 (STEP 302)

As discussed herein there are particular embodiments of the proposed solutions which utilize methods and rules for deciding the measurement gap configuration 234 based on the received indication 232 (or received request 232) indicating the need for measurement gaps for the positioning purpose. The methods and rules are based on the assumption that the indication 232 is received by the radio network node 204 deciding the measurement gaps (also referred to herein as the responsible node 204). The indication 232 may be received either from the UE 202 (as shown) (e.g. via RRC as described in 3GPP TS 36.331, v10.1.0 (2011-03)) or from another network node (e.g., the positioning node 206). At least in some embodiments of the present invention, the measurement gaps may be requested for positioning also for UEs that in general are capable of performing inter-frequency measurements without gaps, e.g. to reduce the UE complexity for positioning. In any case, the indication 232 may contain e.g. one or more of the following:

- A predetermined need indication notifying the radio network node 204 of the UE's need for measurement gaps (e.g. a "start" indicator or a boolean parameter in a predetermined field),
- A measurement gap purpose indicating the purpose for which the UE needs measurement gaps (e.g., a specific positioning method or MDT or a specific positioning measurement in a positioning method),
- One or more frequencies,
- One or more offsets indicating the occurrence of measurements that require measurement gaps,
- One or more pairs, each pair including a frequency and the corresponding offset for that frequency,
- Periodicity of the measurements that require measurement gaps or the preferred measurement gap pattern,
- Cell IDs e.g. PCI, CGI, CSG indicator etc.
- Positioning session identifier to which the measurement gap request or the indication relates,
- RAT,
- Type of service or session
- Emergency indication,
- Overall duration over which the gaps are required As suggested above, particular embodiments may incorporate a need indication into indication 232. In such embodiments, the need indication may represent a predetermined message or an information element which is sent by the UE to its radio network node 204 to indicate that the UE needs measurement gaps for a positioning measurement. For example the indication may be predetermined for a particular type of positioning measurement e.g. OTDOA inter-frequency RSTD measurement.

As also suggested above, particular embodiments may incorporate a measurement gap purpose into indication 232. In such embodiments, the measurement gap purpose may, as one example, indicate that the UE needs measurement gaps for OTDOA positioning measurements. As another example, the measurement gap purpose may explicitly indicate that the UE needs measurement gaps for inter-frequency RSTD measurement which is one of the OTDOA positioning measurements. As yet another example the measurement gap purpose may explicitly indicate that the UE needs measurement gaps for RSRP measurement which is one of the E-CID positioning measurements.

If some information above is provided relative to another (measured) cell (e.g. an offset with respect to the SFN0 of the serving cell), the relation between the parameters for neighbor cells may need to be known and a conversion to the corresponding cell-specific parameter (e.g., to the offset of a neighbor non-serving cell) may need to be performed prior to performing the described herein methods and rules. Alternatively, the conversion of the cell-specific parameters (e.g. PRS offset) may be performed to relative ones with respect to the current cell (e.g., a positioning occasion offset of a neighbor cell relative to the reference SFN such as SFN#0 of the current cell). The conversion results may be maintained and stored in a table in the radio network node 204 (responsible node 204). Another alternative is e.g. to convert the relative positioning occasion offset of a neighbor cell with respect to a given cell positioning occasion and the cell-specific positioning occasion offset of the given cell to the relative positioning occasion offset of the neighbor cell with respect to the reference SFN (e.g. SFN #0) of the given cell.

The information about the timing offsets for neighbor cells may be necessary e.g. to enable the conversion and verification of the requested measurement gap configuration for neighbor cell measurements. The timing offsets (e.g. SFN offsets and/or cell-specific positioning occasion offsets and/or relative positioning occasion offset) may be pre-configured (e.g. in a synchronous network) or calculated by a pre-defined rule or obtained from a table or from another node e.g. a neighbor radio node (e.g. via X2) or a positioning node or an O&M or a home base station (BS) gateway.

The relations between the parameters of neighbor cells and a given cell may be stored in a table and used for the measurement gap configuration and methods described herein. The table may be stored and maintained in the radio network node 204 (responsible node 204) or there may be a neighbor relation table in another network node (e.g. O&M). In view of the above, FIG. 4 is a flowchart illustrating the steps of a method 400 that can be implemented by the radio network node 204 that upon receiving the indication 232 determines if the indication 232 has information for the measured cell relative to a given cell (step 402) and if no then continue to step 304 and if yes then perform a conversion of the measure cell parameters to corresponding given cell-specific parameters (step 404) and store the conversion results of relations between the parameters of the measured cell and the given cell (406) and continue to step 304.

1.1 Verification of the Parameters in the Request (Indication 232)(Steps 304, 306 and 308)

This section describes the conditions and criteria, which can be used for verifying that the UE 202 will perform inter-frequency positioning measurements, which also require gaps (step 304). This is e.g. to prevent the misuse of gaps or erroneous requests. The unnecessary configured gaps lead to loss of downlink throughput and uplink throughput therefore they should be assigned only when necessary.

The radio network node 204 (responsible node 204) verifies the parameters and takes an action:
- if the verification has not passed, go to the next step e.g. acquire more information or ignore the request (step 306),
- if the verification has passed, go to the next step e.g. deciding if configure measurement gaps and determine the positioning measurement gap configuration (steps 308 and 310).

These verification rules may also be used e.g. for protocol testing such as joint protocol testing for RRC or LPP testing.

The verification may be considered as passed when at least one or any combination of the pre-defined conditions is met. For example, the pre-defined conditions may be as follows:
- the indicated cell ID is a possible neighbor,
  - e.g. based on the information from O&M or a neighbor relation table (e.g. ANR) which may be maintained by the radio network node 204 (responsible node 204),
- the positioning session identifier, if provided, is reliable (e.g., unique, not repeating among UEs, not repeating for the same UE over a long period, follows a certain to pattern),
  - in one embodiment, the session identification may be a function of the user identification,
  - in another embodiment, the pattern is shared, e.g. obtained by signaling or pre-configured, between the radio network node 204 (responsible node 204, eNodeB 204) and the node configuring the positioning session (e.g. the positioning node 206).

the positioning method for which measurement gaps are requested is supported in the network,
  e.g. based on the information from O&M,
the UE 202 supports inter-frequency positioning measurements
  e.g., based on received UE capabilities or indication from another network node (e.g. the positioning node 206),
the UE 202 in question has an on-going positioning session or has been requested to perform inter-frequency measurements for positioning. This can be determined by the radio network node in many ways e.g.
  the radio network node 204 (responsible node 204) has received an indication from a network node (e.g. the positioning node 206 or a core network node such as MME),
  the indication has been triggered by LPP in the UE 202 and received by the radio network node 204,
  the indication has been triggered by LPPe in the UE 202 and received by the radio network node 204,
  discovering the on-going positioning session by packet sniffing in the radio network node 204,
there is at least one on-going positioning session via the radio network node 204 (responsible node 204, eNodeB 204) and the radio network node 204 may or may not be aware of the positioning session details (e.g. UE ID),
the UE 202 requires measurement gaps for inter-frequency measurements (e.g. CA UEs may not need measurement gaps),
  e.g. based on received capabilities of the UE 202,
at least a threshold number of the indicated frequency(s) (e.g., one, all) are non-serving frequency(s),
at least a threshold number of the indicated frequency(s) (e.g., one, all) are supported by the UE 202 and/or network and/or potential neighbors,
  e.g. based on received capabilities of the UE 202, O&M information, information from other radio nodes received via X2,
at least a threshold number of the indicated frequency(s) (e.g., one, all) are used for positioning in the network and/or in the local area,
  e.g., based on the information from O&M or the positioning node 206,
at least a threshold number of the indicated frequency(s) (e.g., one, all) have PRS configured,
a pre-configured relation exists between the serving frequency and the indicated inter-frequency, e.g.,
  the inter-frequency shall be higher than the serving frequency,
  the inter-frequency shall be lower than the serving frequency,
the positioning assistance data and the parameters in the indication message are consistent,
  e.g., based on the information from the positioning node 206 or UE 202 (e.g. if the UE 202 may relay the assistance data or its parts),
the reference signal (RS) configuration for signals used for positioning of neighbors are consistent with the parameters (e.g., cell IDs, frequencies and/or offsets) that are present in the indication message 232, e.g. the offsets are consistent with PRS positioning occasions on the indicated frequencies for at least some neighbor cells or the offsets values belong to a feasible set satisfying restrictions on PRS subframe offset such as prsSubframeOffset or similar signaled to facilitate positioning (e.g. via a positioning protocol such as LPP). The RS configuration of neighbors may be obtained e.g. via cross-layer signaling in multi-frequency and multi-standard nodes or via an inter-node interface or signaling via/from O&M, positioning node or neighbor radio nodes,
the requested periodicity is consistent with the measurement occasions periodicity for the requested frequency, cell, etc.
the requested measurement gaps by the UE 202 are consistent with other UEs' requests, e.g. the offsets do not differ by more than X subframes from those received from other UEs for the same frequency,
an emergency indication is on. For example, in particular embodiment, the emergency indication shall be on when there is an on-going emergency session for the UE 202 or an emergency event has been identified in the network.

The actions given above as examples (requesting an indication or confirmation from another network node, packet sniffing, requesting a UE capability, PRS or SFN information from O&M, PRS information from positioning node, information from neighbor radio nodes, etc.) may be performed pro-actively or triggered in the radio network node 204 (responsible node 204) upon receiving the indication 232 (measurement gap request 232).

2A. DETERMINATION AND OPTIMIZATION OF GAP CONFIGURATION BASED ON THE PARAMETERS IN THE GAP REQUEST (STEP 312) (FIG. 5'S STEP 502)

The measurement gap configuration 234 is determined and optimized accounting for the information (parameters) in the indication/request 232 (see FIG. 5's step 502). The optimization may imply configuring measurement gaps with an offset which is not exactly the same as requested but close (e.g. does not differ by more than the maximum positioning occasion duration which is 6 subframes for OTDOA).

The optimization may also account for at least one of
Bandwidth (e.g., serving cell bandwidth or maximum allowed measurement bandwidth or PRS measurement bandwidth),
Positioning measurement requirements (e.g. such as RSTD requirements in 3GPP TS 36.133),
UE CQI reporting configuration, e.g. to not loose the CQI reports from that UE 202. For example, the measurement gaps may be configured to not overlap or to ensure minimum overlap with the CQI measurement and reporting periods.
UE DRX configuration, e.g., so that measurement reports (may be for positioning and non-positioning measurements performed by the UE 202) are sent during DRX ON periods and the current DRX configuration is not "disturbed" or the impact is minimized by the measurement gaps to be used for positioning,
Restricted measurement patterns (e.g. for inter-frequency RRM measurements) or ABS patterns of neighbor cells—e.g. those that may be used with eICIC. For example, the gaps may be configured to maximum overlap with measurement occasions indicated by the patterns for inter-frequency/inter-RAT cells for UEs in the given cell.
CQI restricted measurement patterns (e.g. those used for eICIC), e.g. the measurement gaps may be configured to minimum overlap with the allowed occasions for CQI measurements that are to be performed for the serving cell.

2B. DECIDING THE GAP CONFIGURATION FOR THE UE WHEN MULTIPLE POSSIBILITIES FOR GAP CONFIGURATIONS ARE INDICATED (STEP 312) (FIG. 5'S STEPS 504 AND 506) (FIG. 6)

Figure 6:
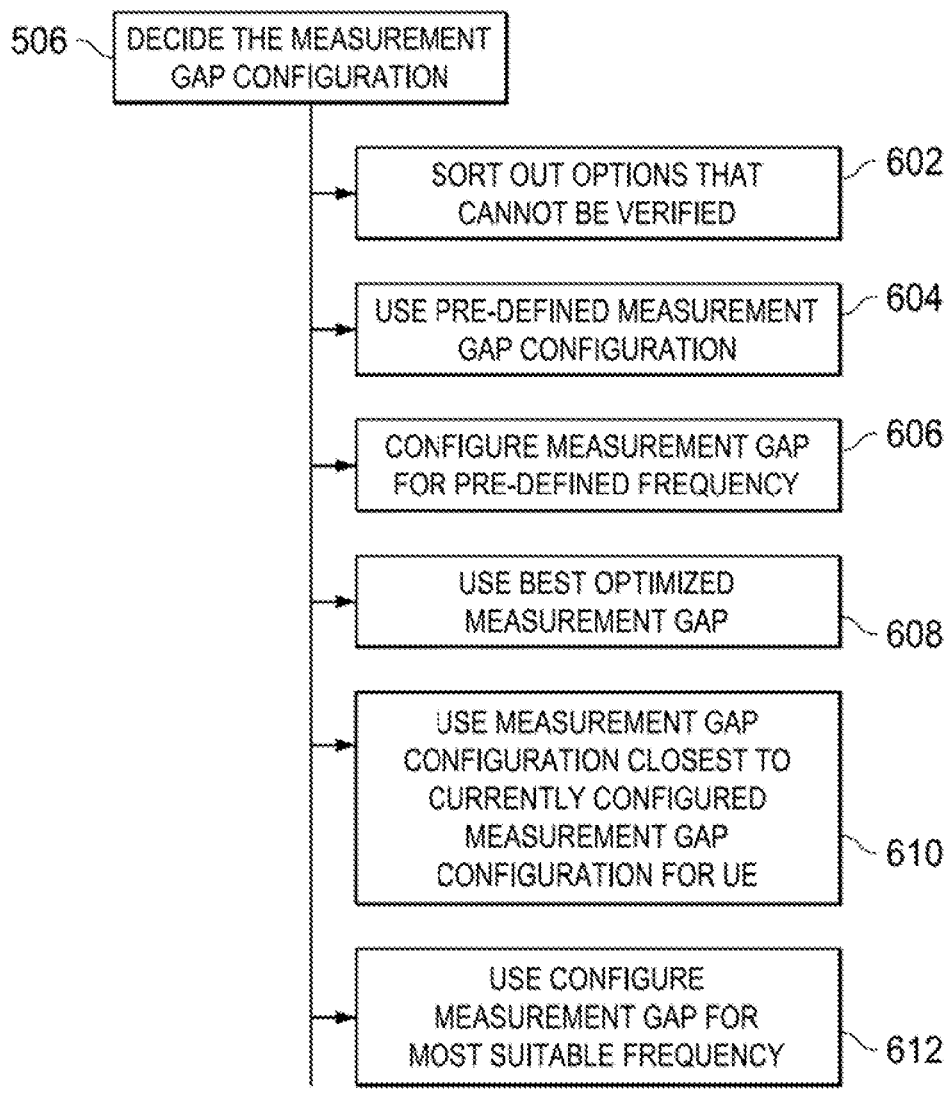
FIG. 6 is a flowchart illustrating the steps associated with a decide the measurement gap configuration step of the method shown in FIG. 5 in accordance to an embodiment of the present invention.

When multiple alternatives are possible for the information provided in the measurement gap indication/request 232, the radio network node 204 (responsible node 204) may take at least one of the following actions to decide the measurement gap configuration 234 (FIG. 5's steps 504 and 506):

- Sort out (e.g., exclude, do not configure) the options that cannot be verified (e.g. for frequencies outside a pre-determined set) (FIG. 6's step 602).
- Sort out (e.g., exclude, do not configure) the options that have not passed verification (FIG. 6's step 602).
- Use a pre-defined measurement gap configuration response to the received indicator/request 232 (FIG. 6's step 604):
  - May be the same configuration for all UEs in the cell or for all UEs in the center part of the cell (e.g. UEs with TA or RSRP in a given range) or for a group of UEs that are expected to be in certain part of the cell (e.g. UEs reporting the same set of strongest neighbors).
- Configure measurement gaps for a pre-defined frequency, irrespective of the frequencies in the indicator/request 232 (FIG. 6's step 606).
- Decide the best optimized (or the closest to the optimal) measurement gap option according to e.g. methods for optimizing measurement gap configuration (FIG. 6's step 608). Some examples of a closest to the optimal measurement configuration are closest in time to the requested offset or closest to a given number of neighbor cells on the frequency, or closest to the largest overlap with the RS to be measured.
- Use the measurement gap option which implies the measurement gap configuration closest to the currently configured measurement gap configuration for the requesting UE 202 (see FIG. 6's step 610).
- Configure measurement gaps for the most suitable frequency (see FIG. 6's step 612), where the most suitable frequency may be:
  - With the largest system or PRS bandwidth,
  - With the shortest PRS periodicity,
  - Lowest frequency when better hearability is needed,
  - With the sufficiently many neighbor cells or sites (e.g. there are at least X cells or at least Y sites operating on this frequency) in an area,
  - With better or continuous coverage,
  - Where lower interference is expected.

2C. DECIDING WHETHER TO CONFIGURE/RECONFIGURE MEASUREMENT GAPS FOR POSITIONING (STEP 312) (FIG. 5'S STEP 508)

In particular embodiments of the present invention, the measurement gap configuration/reconfiguration decision is made based on a priority level (step 312) (FIG. 5's step 508). The priority level can be pre-defined or configured by a network node (e.g., the radio network node 204, the positioning node 206, core network node etc). In one embodiment, the priority may be zero, which corresponds to a decision to not configure measurement gaps for the received request 232 indicating the need for measurement gaps for positioning.

The priority for configuring or reconfiguring the measurement gaps may be based on or linked to one or more of the following (though not limited to the examples below):

- General client type or LCS Client Type,
- Positioning service type (e.g. related to the severity of the positioning service, LCS commercial, LCS emergency etc.)
- Requested positioning measurement(s) type (e.g., OTDOA RSTD measurement, E-CID UE Rx-Tx time difference, E-CID RSRP or RSRQ, etc.),
- The time elapsed from the last measurement gap configuration configured by the radio network node 204 (responsible node 204) does not exceed a certain threshold (e.g. in this case reconfiguration may be delayed or rejected),
  - In one embodiment, the last measurement gap configuration is not related to positioning measurements,
  - In another embodiment, the last measurement gap configuration is related to positioning measurements,
- The number of measurement gap requests for positioning measurements exceeds a certain threshold over a certain period,
- Another measurement gap request has been earlier received for the same positioning session,
- The measurement gap configuration has been already configured for a positioning session with a given identifier,
- On-going positioning measurement(s) type if any e.g., OTDOA RSTD measurement, E-CID such as UE Rx-Tx time difference etc. This is because the new positioning measurement may affect the performance of the existing ones. This may also be related to the maximum allowed reporting criteria and the maximum possible measurements (e.g. the reporting criteria as UE requirements may be not enough for all possible measurements, therefore a priority decision may need to be taken).
- On-going non-positioning measurement(s) type if any e.g., RRM or mobility, MDT, SON etc. especially in case the on-going non-positioning measurements will be interrupted or requirements will become worse in the case of starting new positioning measurements. This may also be related to the set of reporting criteria specified for UEs.
- Estimated period over which measurement gap has to be configured. This in turn depends upon the measurement session for a given service. For example, a higher priority may be set in case a shorter time is needed for gap-assisted measurement session. This is because a shorter time over which gap-assisted measurements causes less degradation of the serving cell performance (e.g., lower throughput loss),
- Required performance of serving cell. The gap assisted measurement degrades the serving cell performance. For example, gap assistance measurements may have lower priority if it is necessary to maintain certain serving cell performance, which cannot be achieved when gaps are configured. The serving cell performance may e.g. relate to the on-going service, requested service, on-going non-positioning or positioning measurements, requested positioning measurements.

The measurement gap indicator/request 232 for positioning may e.g. be given a higher priority or always satisfied (top priority) e.g. when:

- There is an on-going emergency session for the concerned UE 202 (e.g. emergency call or texting) or has the emergency indication ON in the request message.
- The coverage on the serving frequency is poor or the number of bearable neighbors on the serving frequency is expected to be small (e.g., when the serving frequency is used for indoor coverage only and/or for lower power nodes such as femto or pico nodes).

The serving cell is a lower power node (e.g., femto cell or pico cell).

The serving cell is weak (e.g., when the UE 202 is at the edge or in the cell range expansion region.

The verification step for the indicator/request 232 may be performed prior to or after the decision to configure measurement gaps for positioning in certain embodiments of the present invention.

2D. MEASUREMENT RAP CONFIGURATION FLOW AND RULES FOR DECIDING WHETHER TO STOP MEASUREMENT GAPS CONFIGURED FOR THE PURPOSE OF POSITIONING (STEP 312) (FIG. 5'S STEP 510)

It is common to use timers or stop indications to stop certain processes. A stop indication may also be transmitted when measurement gaps are not needed any more for inter-frequency RSTD measurements. A straightforward solution is to stop the measurement gaps upon such a request if they have not been used by the UE 202 before configuring them for the positioning purpose. However, the solution is less trivial if e.g. the measurement gaps have been used for other purposes.

In particular embodiments of the present invention, the radio network node 204 (responsible node 204) can perform the following steps in relation to measurement gap configuration for the purpose of positioning:

1. When the indication/request 232 for measurement gaps for positioning is received, decide whether the measurement gaps are to be configured (e.g. according to any of the methods described herein) and continue if the decision is positive or stop at this step otherwise.
2. If the earlier configured measurement gaps are to be reconfigured, store the current measurement gap configuration before configuring a new one for positioning or turn on an indicator for this UE 202 indicating that another measurement gap configuration has been used or save the reference/index of the measurement gap configuration used.
   a. In one embodiment a limited set of measurement gap configurations may be used in the cell, e.g. in the simplest case: general measurement gap configuration and measurement gap configuration for positioning, so the radio network node 204 (responsible node 204) may just switch between the two configurations upon receiving the measurement gap indication message or the stop indication message for switching back.
3. Configure measurement gaps for positioning.
4. When a stop indication is received or a timer is expired or another trigger for stopping positioning measurement gaps occurs, stop positioning measurement gaps and:
   a. If other measurement gap configuration was used before positioning measurement gaps were configured and no event indicating no need for the old gaps has occurred, restore the old configuration, or
   b. If a need for measurement gap configuration is different from that for positioning has aroused while the positioning measurement gaps have been used, then reconfigure measurement gaps for the purpose other than positioning (in one embodiment, switch to a default one non-positioning configuration).

2E. METHODS AND RULES/REQUIREMENTS FOR CONFIGURING MEASUREMENT GAPS BASED ON OTHER MEASUREMENTS (STEP 312) (FIG. 5'S STEP 512) (FIG. 7'S STEPS 702 AND 704)

According to one embodiment the radio network node 204 (responsible node 204) takes into account non-positioning gap assistant measurements e.g. mobility, SON, MDT etc to decide whether to configure/reconfigure measurement gaps for positioning measurements or not. This situation may arise especially:

When the on-going gaps need to be shifted in time to ensure that the PRS signals fall in the gap (FIG. 7's step 702); or Currently gap configuration is not applicable for positioning measurements e.g. gap id #1 is used but gap id #0 is needed for positioning (FIG. 7's step 704).

In one example if several gap-assisted mobility measurements (e.g. more than N measurements in parallel) are performed by the UE 202 in parallel then the radio network node 204 (responsible node 204) may slightly delay the gap configuration for the positioning measurements. The reason is to prevent unnecessary delay in mobility measurements since more measurements in parallel lead to longer delay.

In another example, if there are on-going gap-assisted mobility measurements (e.g. more than N measurements in parallel) and the gaps do not have to be shifted then the radio network node 204 (responsible node 204) may allow the UE 202 to perform positioning measurements in the gaps.

In another example, if no non-positioning measurements being performed then the radio network node 204 (responsible node 204) may assign the gaps for positioning measurements but may also use this opportunity for obtaining other gaps assistant measurements from the UE 202 e.g. mobility, SON, MDT etc.

The following are two pre-determined rules which can be specified to allow the UE 202 to perform one or more best effort gap-assisted measurements in conjunction with the gap assistant positioning measurements. The two rules are described below:

1. According to one pre-determined rule when the UE 202 is assigned gaps for positioning measurements then the UE 202 shall also perform one or more measurements in best effort manner e.g. SON or MDT measurements. The best effort implies that the UE 202 does not have to meet strict requirements. Note that in this case the assigned gaps may also be used by the UE 202 for other measurements (e.g. mobility measurements such as RSRP) in addition to the positioning measurements.

2. According to the second pre-determined rule when the UE 202 is performing only positioning measurements in the assigned gaps, then the UE 202 shall also perform one or more measurements in a best effort manner e.g. SON or MDT measurements. The difference compared to the first example of the pre-defined rule is that in this case the best effort measurements are performed by the UE 202 when only the positioning measurements are done in the gaps. The advantage is that the performance of the best effort measurements is better compared to those done according to the first pre-defined rule. The reason is that relatively fewer measurements are performed in the gaps. A further refinement of this rule could be that the best effort measurements may only be performed when a particular type of positioning measurements (e.g. OTDOA) are performed in the gaps.

The set of best effort measurements can also be pre-defined or they can be configured by the radio network node 204 (responsible node 204).

3. METHODS AND RULES/REQUIREMENTS FOR CONFIGURING MEASUREMENT GAPS ENSURING THAT POSITIONING MEASUREMENT REQUIREMENTS ARE MET

In particular embodiments of the present invention, the radio network node 204 (responsible node 204) may be required to configure measurement gaps for positioning under certain requirements, e.g. within a certain time after receiving the indication/request 232 for the positioning measurement gaps. The time requirement may be a fixed maximum time or may depend, e.g., on the expected duration of the positioning session (e.g. on Tprs, or PRS periodicity). The time requirement may also depend on the positioning method and the UE DRX state, e.g. a longer time may be allowed for E-CID for UEs in DRX or for OTDOA.

4. EXPLOITING THE CO-SITED OR MULTI-FREQUENCY OR MULTI-RAT NODES

In particular embodiments of the present invention, the radio network node 204 (responsible node 204) can make the decision on configuring/reconfiguring or stopping (a special form of reconfiguring) measurement gaps based on the information about other frequencies/bands and RATs as well as positioning-related configuration (e.g. radio node activity periods, PRS availability, PRS periodicity, PRS offset, feasible set of PRS configurations or restrictions on them e.g. a restriction on PRS subframe offset such as prsSubframeOffset signaled according to between two cells, etc,) or internal node measurements obtained from:
   a co-located node, or via cross-layer communication with a functional block responsible for another RAT or frequency/band, or
   internal information about the other frequency/band/RAT supported by the node, where the node may be e.g. multi-frequency or multi-band node, multi-RAT node or multi-standard radio (MSR) node.

In one embodiment, the information obtained as described above may be used to avoid acquiring similar information from other nodes e.g. via X2 or via O&M when e.g. it is expected that the configuration of other nodes on frequency f2 is the same as the configuration of this (multi-frequency/bad/RAT) node or co-located node on the same frequency f2. For example, PRS periodicity may be the same in all macro cells on the same frequency and in addition the PRS occasions in these cells may overlap or be synchronized or aligned. Therefore, X2-signaling may be avoided by acquiring the PRS configuration on f2 of the cells associated with the current (multi-frequency/band/RAT) or co-located node. This embodiment may also be combined with other embodiments described herein, e.g., methods and rules for deciding measurement gap configuration based on a received request for measurement gaps for positioning, including verification, or methods and rules/requirements for configuring measurement gaps based on other measurements such as mobility measurements (e.g. RSRP, RSRQ etc).

In another embodiment, a network node (e.g. O&M, SON, core network, another radio network node e.g. via X2 a macro BS may provide such information to smaller BSs in its area or other neighbor macro BSs, etc) may configure the radio network node 204 (e.g. eNode B) with the information which indicates whether all cells on certain carrier in an area or co-located cells in all nodes in the area on certain carrier frequencies/RATs have similar positioning configuration setting or not. For example, assume the network node has co-located cells on f1, f2 and f3. The network node may inform each eNode B that all cells on each of the frequencies supporting positioning (in one example) or only on f1 and f3 (in another example) in the network have similar or even the same configuration or setting related to positioning e.g. PRS BW, PRS periodicity, positioning sub-frames in a positioning occasion etc. In another embodiment, the parameters of the positioning-related configuration (e.g. PRS periodicity, PRS offset, PRS bandwidth, PRS subframes per positioning occasion, etc.) that are similar in the indicated cells may also be a part of the information provided by the network node.

5. UE AUTONOMOUS MEASUREMENT GAPS FOR POSITIONING

In particular embodiments of the present invention, the UE 202 may configure autonomous gaps for positioning measurements (e.g. inter-frequency E-CID or OTDOA measurements) or MDT. The autonomous gap configuration can be based on a pre-defined rule. For instance the configuration can be based on the type of the service which in turn may depend upon specific type of measurements. For example, according to one pre-defined rule the UE 202 is:
   Allowed to autonomously configure the gaps for inter-frequency OTDOA measurements. In one embodiment, the OTDOA measurements may be specifically used in relation to emergency calls (e.g. an emergency even is identified by the UE 202 e.g. by indication from the network or an emergency session is on-going).
   Autonomous gap configuration may be allowed in a power saving mode or IDLE state or DRX or in case there is a poor connection to the serving cell or reference cell.
   Not allowed to autonomously configure E-CID inter-frequency and/or inter-RAT measurements (e.g. RSRP, RSRQ, CPICH RSCP etc).

According to another pre-defined rule the UE 202 is allowed to autonomously configure gaps for a group or category of gap-assistant positioning measurements. The group of measurements can be indicated by a network node (e.g. eNodeB 204, radio network node 204, or the positioning node 206). For example group 0 and group 1 comprises of inter-frequency to OTDOA measurements and inter-frequency E-CID measurements respectively. As an example the radio network node 204 (eNodeB 204) can indicate to the UE 202 that it can autonomously use gaps for group 1 measurements. Hence, the UE 202 when measuring group 1 measurements can autonomously configure the gaps. In a special case, a group may consist of one measurement.

6. CONCLUSION

From the foregoing, the skilled person having the foregoing teaching will readily appreciate that among other things a radio network node 204 (e.g., eNodeB 204, responsible node 204) is described above for configuring a measurement gap for positioning to be used by a UE 202. Thus, in particular embodiments, the described solutions provide:
   Methods and rules for deciding measurement gap configuration based on a received request for measurement gaps for positioning, e.g. for
   Verifying the parameters in the request,
   Optimizing the gap configuration based on the parameters in the gap request,
   Deciding the gap configuration for a UE when multiple possibilities for gap configurations are indicated,
   Deciding whether to configure/reconfigure measurement gaps for positioning e.g. based on priority, Deciding whether to stop measurement gaps based on the stop indication, Deciding whether to configure/reconfigure measurement gaps for positioning based on non-positioning gap assistant measurements e.g. mobility, SON, MDT etc.

Methods and rules/requirements for configuring measurement gaps ensuring that positioning measurement requirements are met.

The present invention has several technical advantages some of which are as follows:

Improved positioning accuracy due to optimized positioning measurement gap configuration.

Determined behavior for nodes configuring measurement gaps.

Enabled verification of the data transmitted in the positioning measurement gap request and minimizing the probability of the signaling misuse.

Pre-defined rules for positioning measurement gap requests are helpful for consistent UE and eNodeB behavior, which may also be tested.

Minimized disturbance to other UE measurements during inter-frequency positioning measurement thanks to optimized positioning measurement gap configuration.

Low-overhead communication making radio nodes aware when the positioning related configuration is similar or the same in all cells in certain frequencies.

Further reduced communication overhead with multi-frequency/multi-band/multi-RAT/MSR/mixed-mode nodes and with co-located nodes.

The example UE 202 illustrated in FIG. 2 includes the antenna 208, the transceiver 210, the processor 212, and the memory 214. In particular embodiments, some or all of the functionality described above as being provided by the UE 202 or another form of mobile communication device may be provided by the processor 212 executing instructions stored on a computer-readable medium, such as the memory 214. Alternative embodiments of the UE 202 may include additional components beyond those shown in FIG. 2 that may be responsible for providing certain aspects of the UE's functionality, including any of the functionality described above and/or any functionality necessary to support the solutions described above.

The example radio network node 204 (e.g. base station 204) shown in FIG. 2 includes the antenna 216, the transceiver 218, the network interface 220, the processor 222, and the memory 224. In particular embodiments, some or all of the functionality described above as being provided by the radio network node 204 which can be for instance a mobile base station, a base station controller, a node B, an enhanced node B, and/or any other type of mobile communications node may be provided by the processor 222 executing instructions stored on a computer-readable medium, such as the memory 224 shown in FIG. 2. Alternative embodiments of the radio network node 204 may include additional components responsible for providing additional functionality, including any of the functionality identified above and/or any functionality necessary to support the solution described above.

The example positioning server 206 shown in FIG. 2 includes the network interface 226, the processor 228, and the memory 230. In particular embodiments, some or all of the functionality described above as being provided by the positioning server 206 which can be for instance an E-SMLC, a SLP, and/or any other type of node involved in the described positioning services may be provided by the processor 228 executing instructions stored on a computer-readable medium, such as the memory 230 shown in FIG. 2. Alternative embodiments of the positioning server 206 may include additional components responsible for providing additional functionality, including any of the functionality identified above and/or any functionality necessary to support the solution described above.

The skilled person should appreciate that the embodiments described herein are not limited to the currently standardized positioning measurements and methods. Furthermore, the following should be recognized in reading the description above:

1. The assistance data used in the present invention shall be understood in a broader sense as the data transmitted by a network node 204 to the UE 202 in order to assist in positioning measurements. The assistance data comprises at least a list of two cells (e.g., cell identifiers). In one specific example the assistance data is OTDOA assistance data in LTE.

2. Although the description is mainly given for UE, it should be understood by the skilled in the art that "UE" is a non-limiting term which means any wireless device or node (e.g. PDA, laptop, mobile, sensor, fixed relay, mobile relay or even a small base station that is being positioned when timing measurements for positioning are considered, i.e. a LCS target in general). The present invention may apply both for UEs capable and not capable of performing inter-frequency measurements without gaps, e.g. also including UEs capable of carrier aggregation.

3. A cell is associated with a radio node, where a radio node or radio network node or eNodeB (all of which are used interchangeably herein) comprise in a general sense any node transmitting radio signals that may be used for positioning, measurements, e.g., eNodeB, macro/micro/pico base station, home eNodeB, relay, beacon device, or repeater. More than one cells may also be associated with a radio node. The radio node may also be a multi-RAT or multi-standard radio (MSR) node.

4. The positioning node 206 described in different embodiments is a node with positioning functionality. For example, for LTE the positioning node 206 may be understood as a positioning platform in the user plane (e.g., SLP in LTE) or a positioning node in the control plane (e.g., E-SMLC in LTE). SLP may also include SLC and SPC, where SPC may also have a proprietary interface with E-SMLC. In a testing environment, at least the positioning node may be simulated or emulated by test equipment.

5. The signaling described herein is either via direct links or logical links (e.g. via higher layer protocols and/or via one or more network nodes). For example, in LTE in the case of signaling between E-SMLC and LCS Client the positioning result may be transferred via multiple nodes (at least via MME and GMLC).

6. The described solutions are not limited to implementation only in LTE networks, but may apply with any RAN, single- or multi-RAT. Some other RAT examples are LTE-Advanced, UMTS, GSM, cdma2000, WiMAX, and WiFi.

7. The present invention and in particular the embodiments involving signaling or autonomous identification and usage of the indication of the timing information awareness may be, with straightforward changes, applied in any network and network nodes that rely on the availability of the timing information of at least some cells, which, without signaling or autonomous identification, would not be able to provide reliable service. One service, example is positioning, and the network node example is the positioning node 206.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the is present invention that as has been set forth and defined within the following claims.

The invention claimed is:

1. A radio network node for configuring a measurement gap for positioning to be used by a user equipment (UE), the radio network node comprising:
   a memory configured to store processor-executable instructions; and
   a processor configured to interface with the memory and, by executing the processor-executable instructions, to:
      receive an indication from the UE indicating that the UE needs measurement gaps for positioning;
      verify parameters in the indication to determine if one or more pre-defined conditions are met to indicate that the UE is able to perform inter-frequency positioning measurements;
      decide whether to configure the measurement gaps,
      in response to deciding to configure the measurement gaps, determine a measurement gap configuration and send the measurement gap configuration to the UE;
   perform at least one of deciding whether to configure the measurement gaps and verifying the parameters based on internal measurements or information obtained from a co-located node or via cross-layer communication; and
   wherein the memory and processor are components of the radio network node.

2. The radio network node of claim 1, wherein the indication comprises one or more of the following parameters:
   a need indication;
   a measurement gap purpose;
   one or more frequencies;
   one or more offsets indicating an occurrence of measurements that require measurement gaps;
   one or more pairs, each pair comprising a frequency and a corresponding offset for that frequency;
   a periodicity of measurements that require measurement gaps or a preferred measurement gap pattern;
   cell identifications;
   a radio access technology (RAT);
   a type of service or session;
   an emergency indication; and
   an overall duration over which the measurement gaps are required.

3. The radio network node of claim 1, wherein the processor is further configured to receive the indication by:
   determining if the indication has information for the measured cell relative to a given cell; and
   in response to determining the indication has information for the measured cell relative to a given cell, converting the information to a corresponding cell-specific parameter and storing the conversion results of relations between parameters of the measured cell and the given cell.

4. The radio network node of claim 1, wherein the processor is further configured to verify the parameters by acquiring additional information to determine if the UE will perform inter-frequency positioning measurements.

5. The radio network node of claim 1, wherein the processor is further configured to verify the parameters by determining if one or more of the following pre-defined conditions are met:
   an indicated cell identification is of a possible neighbor cell;
   a requested positioning method is supported by a network associated with the radio network node;
   a positioning session identifier, if provided, is reliable;
   the UE supports inter-frequency positioning measurements or the UE requires measurement gaps for inter-frequency measurements;
   the UE has an on-going positioning session or has been requested to perform inter-frequency measurements for positioning;
   at least one positioning session via the radio network node is on-going;
   parameters in the indication are consistent with assistance data or a reference signal configuration of one or more serving or neighbour radio network nodes;
   the measurement gaps requested by the UE are consistent with other UEs' requests;
   at least a threshold number of the indicated frequency(s) are non-serving frequency(s);
   at least a threshold number of the indicated frequency(s) are supported by at least one of the UE, a network and potential neighboring radio network nodes,
   at least a threshold number of the indicated frequency(s) are used for positioning in at east one of network and local area;
   at least a threshold number of the indicated frequency(s) have a positioning reference signal (PRS) configured;
   a pre-configured relation exists between serving frequency and the indicated inter-frequency;
   a requested periodicity is consistent with measurement occasions periodicity for a requested frequency and cell;
   parameters in the indication are consistent with positioning assistance data sent to the UE by positioning node; and
   an emergency session for the UE is on-going or an emergency event has been identified in the network.

6. The radio network node of claim 1, wherein the processor is further configured to determine the measurement gap configuration by optimizing the configured measurement gaps based on the parameters in the indication and configure measurement gaps with an offset which is not the same as in the indication.

7. The radio network node of claim 1, wherein the processor is further configured to determine the measurement gap configuration by determining if there are multiple options for configuring the measurement gaps that are possible in accordance with the received indication.

8. The radio network node of claim 7, wherein the processor is further configured to determine that there are multiple options for configuring the measurement gaps and, in response to determining that there are multiple options, decide the measurement gap configuration by performing at least one of the following:
   sorting out measurement gaps that cannot be verified or do not pass verification;
   using a pre-defined measurement gap configuration responsive to the received indication;
   using a measurement gap for a pre-defined frequency irrespective of frequencies in the indication;
   using a best optimized measurement gap configuration;
   using a measurement gap configuration closest to a currently configured measurement gap for the UE; and
   using a measurement gap configuration for a most suitable frequency which is one of: a frequency with largest positioning reference signaling bandwidth; a frequency with shortest positioning reference signaling periodicity; a lowest frequency; a frequency at which multiple non-sewing cells operate; a frequency with most continuous coverage; and a frequency with lowest interference.

9. The radio network node of claim 1, wherein the processor is further configured to determine the measurement gap configuration by determining whether to configure or reconfigure the measurement gap for positioning purposes based on a priority level.

10. The radio network node of claim 9, wherein factors for determining the priority level include one or more of the following:
   a general client type or location service (LCS) Client Type,
   a positioning service type;
   a requested positioning measurement(s) type;
   whether a time elapsed from last measurement gap configuration configured by the radio network node does not exceed a certain threshold;
   whether a number of measurement gap requests for positioning measurements exceeds a certain threshold over a certain period;
   whether another measurement gap request has been earlier received for the same positioning session;
   whether a measurement gap configuration has been already configured for a positioning session with a given identifier;
   an on-going positioning measurement(s) type if any;
   an on-going non-positioning measurement(s) type;
   an estimated period over which the measurement gap has to be configured; and
   a required performance of a serving cell related to service and/or positioning or non-positioning measurements.

11. The radio network node of claim 1, wherein the indication for positioning is given a higher priority when at least one of: (1) an emergency session for the UE is on-going; (2) coverage on a serving frequency is below a threshold or a number of hearable neighbors on the serving frequency is expected to be below a threshold; (3) a serving cell is a lower power node; and (4) a serving cell is weak when the UE is at an edge or in a cell range expansion region.

12. The radio network node of claim 1, wherein the processor is further configured to stop the measurement gap configuration for positioning purposes when a stop indication is received or a timer is expired or another trigger for stopping positioning measurement gaps occurs then stop configuring the measurement gaps.

13. The radio network node of claim 1, wherein the processor is further configured to determine the measurement gap configuration by determining that an old measurement gap configuration was used before the determined measurement gap configuration and no event indicating there is no need for the old measurement gap configuration has occurred then restore the old measurement gap configuration, or that a need for a measurement gap configuration different from the old measurement gap configuration for positioning has arisen while the determined measurement gap configuration has been used and, in response, reconfiguring measurement gaps for a purpose other than positioning.

14. The radio network node of claim 1, wherein the processor is further configured to determine the measurement gap configuration by deciding whether to configure or reconfigure the measurement gap configuration for positioning based on non-positioning measurements performed in measurement gaps.

15. The radio network node of claim 14, wherein the processor is further configured to decide whether to reconfigure the measurement gap configuration for positioning based on non-positioning measurements performed in measurement gaps when:
   on-going gaps need to be shifted in time to ensure that positioning reference signals fall in the measurement gap; or
   a current measurement gap configuration is not applicable for positioning measurements.

16. The radio network node of claim 15, wherein the non-positioning measurements performed in measurement gaps comprise one or more of the following:
   mobility measurements;
   minimization of drive test (MDT) measurements; and
   self organizing network (SON) measurements.

17. The radio network node of claim 1, wherein one or more parameters used for determining whether to configure the measurement gaps or not are received by the radio network node by one or more mechanisms as follows:
   from another radio network node;
   from another network node including an Operations & Maintenance (O&M) core network node, a self organizing network (SON), a minimization of drive test (MDT) node or a positioning node;
   from UE;
   by packet sniffing; and
   in a UE capability message.

18. The radio network node of claim 1, wherein the processor is further configured to verify the parameters by determining if a pre-defined condition as follows is met:
   a requested positioning method is supported by a network associated with the radio network node.

19. The radio network node of claim 1, wherein the processor is further configured to verify the parameters by determining if a pre-defined condition as follows is met:
   the UE supports inter-frequency positioning measurements or the UE requires measurement gaps for inter-frequency measurements.

20. The radio network node of claim 1, wherein the processor is further configured to verify the parameters by determining if a pre-defined condition as follows is met:
   at least a threshold number of the indicated frequency(s) are non-serving frequency(s).

21. The radio network node of claim 1, wherein the processor is further configured to verify the parameters by determining if a pre-defined condition as follows is met:
   at least a threshold number of the indicated frequency(s) are supported by at least one of the UE, a network and potential neighboring radio network nodes.

22. A method implemented by a radio network node for configuring a measurement gap for performing at least one positioning measurement to be used by a user equipment (UE), the method comprising the steps of:
   receiving, by the radio network node, an indication from the UE indicating that the UE needs measurement gaps for positioning;
   verifying, by the radio network node, parameters in the indication to determine if one or more predefined conditions are met to indicate that the UE is able to perform inter-frequency positioning measurements;
   deciding whether to configure the measurement gaps
   in response to deciding to configure the measurement gaps, determining a measurement gap configuration and sending the measurement gap configuration to the UE; and
   performing at least one of deciding whether to configure the measurement gaps and verifying the parameters based on internal measurements or information obtained from a co-located node or via cross-layer communication.

23. The method of claim 22, wherein the indication comprises one or more of the following parameters:

a need indication;
a measurement gap purpose;
one or more frequencies;
one or more offsets indicating an occurrence of measurements that require measurement gaps;
one or more pairs, each pair comprising a frequency and the corresponding offset for that frequency;
periodicity of measurements that require measurement gaps or a preferred measurement gap pattern;
cell identifications;
a radio access technology (RAT);
a type of service or session;
an emergency indication; and
an overall duration over which the measurement gaps are required.

24. The method of claim 22, wherein the receiving step further comprises the steps of determining if the indication has information for the measured cell relative to a given cell and in response to determining the indication has information for the measured cell relative to a given cell, converting the information to a corresponding cell-specific parameter and storing the conversion results of relations between parameters of the measured cell and the given cell.

25. The method of claim 22, wherein the verifying step further comprises acquiring additional information to determine if the UE will perform inter-frequency positioning measurements.

26. The method of claim 22, wherein verifying the parameters further comprises determining if one or more of the following pre-defined condition are met:
an indicated cell identification is a possible neighbor cell;
a requested positioning method is supported by a network associated with the radio network node;
a positioning session identifier, if provided, is reliable;
the UE supports inter-frequency positioning measurements r or the UE requires measurement gaps for inter-frequency measurements;
the UE has an on-going positioning session or has been requested to perform inter-frequency measurements for positioning;
at least one positioning session via the radio network node is on-going;
parameters in the indication are consistent with assistance data or RS configuration of one or more serving or neighbour radio network nodes;
the measurement gaps requested by the UE are consistent with other UEs' requests;
at least a threshold number of the indicated frequency(s) are non-serving frequency(s);
at least a threshold number of the indicated frequency(s) are supported by at least one of the UE, a network and potential neighboring radio network nodes,
at least a threshold number of the indicated frequency(s) are used for positioning in at least one of network and local area;
at least a threshold number of the indicated frequency(s) have positioning reference signal (PRS) configured;
a pre-configured relation exists between serving frequency and the indicated inter-frequency;
a requested periodicity is consistent with measurement occasions periodicity for requested frequency and cell;
parameters in the indication are consistent with positioning assistance data sent to the UE by positioning node; and
an emergency session for the UE is on-going or an emergency event has been identified in the network.

27. The method of claim 22, wherein determining the measurement gap configuration comprises optimizing the configured measurement gaps based on the parameters in the indication and configure measurement gaps with an offset which is not the same as in the indication.

28. The method of claim 22, wherein determining the measurement gap configuration comprises determining if there are multiple options for configuring the measurement gaps that are possible in accordance with the received indication.

29. The method of claim 28, further comprising determining that there are multiple options for configuring the measurement gaps and, in response, deciding the measurement gap configuration by performing at least one of the following:
sorting out measurement gaps that cannot be verified or do not pass verification;
using a pre-defined measurement gap configuration responsive to the received request;
using a measurement gap with pre-defined frequency irrespective of frequencies in the indication;
using a best optimized measurement gap configuration;
using a measurement gap configuration closest to currently configured measurement gap for the UE; and
using a measurement gap configuration for a most suitable frequency which is one of: a frequency with largest positioning reference signaling bandwidth; a frequency with shortest positioning reference signaling periodicity; a lowest frequency; a frequency at which multiple non-sewing cells operate; a frequency with most continuous coverage; and a frequency with lowest interference.

30. The method of claim 22, wherein determining the measurement gap configuration comprises determining whether to configure or reconfigure the measurement gap for positioning purposes based on a priority level.

31. The method of claim 30, wherein factors for determining the priority level include one or more of the following:
a general client type or location service (LCS) Client Type,
a positioning service type;
a requested positioning measurement(s) type;
whether a time elapsed from last measurement gap configuration configured by the radio network node does not exceed a certain threshold;
whether a number of measurement gap requests for positioning measurements exceeds a certain threshold over a certain period;
whether another measurement gap request has been earlier received for the e positioning session;
whether a measurement gap configuration has been already configured for a positioning session with a given identifier;
an on-going positioning measurement(s) type if any;
an on-going non-positioning measurement(s) type;
an estimated period over which the measurement gap has to be configured; and
a required performance of a serving cell related to service and/or positioning or non-positioning measurements.

32. The method of claim 22, further comprising giving the indication for positioning a higher priority when at least one of: (1) an emergency session for the UE is on-going; (2) coverage on a serving frequency is below a threshold or a number of bearable neighbors on the serving frequency is expected to be below a threshold; (3) a serving cell is a lower power node; and (4) a serving cell is weak when the UE is at an edge or in a cell range expansion region.

33. The method of claim 22, further comprising stopping the measurement gap configuration for positioning purposes when a stop indication is received or a timer is expired or another trigger for stopping positioning measurement gaps occurs then stop configuring the measurement gaps.

34. The method of claim 22, wherein determining the measurement gap configuration comprises determining that an old measurement gap configuration was used before the determined measurement gap configuration and no event indicating there is no need for the old measurement gap configuration has occurred then restore the old measurement gap configuration, or that a need for a measurement gap configuration different from the old measurement gap configuration for positioning has arisen while the determined measurement gap configuration has been used and, in response, reconfiguring measurement gaps for a purpose other than positioning.

35. The method of claim 22, wherein determining the measurement gap configuration comprises deciding whether to configure or reconfigure the measurement gap configuration for positioning while accounting for non-positioning measurements performed in measurement gaps.

36. The method of claim 35, when deciding results in reconfiguring the measurement gap configuration for positioning based on non-positioning measurements performed in measurement gaps when:
   on-going gaps need to be shifted in time to ensure that positioning reference signals fall in the measurement gap; or
   a current measurement gap configuration is not applicable for positioning measurements.

37. The method of claim 36, wherein the non-positioning measurements performed in measurement gaps comprises one or more of the following:
   mobility measurements;
   minimization of drive test (MDT) measurements; and
   self organizing network (SON) measurements.

38. The method of claim 22, wherein one or more parameters used for determining whether to configure the measurement gaps or not are received by the radio network node by one or more mechanisms as follows:
   from another radio network node;
   from another network node including an Operations & Maintenance (O&M) core network node, a self organizing network (SON), a minimization of drive test (MDT) node or a positioning node;
   from UE;
   by packet sniffing; and
   in a UE capability message.

39. The method of claim 22, wherein verifying the parameters further comprises determining if a pre-defined condition as follows is met:
   a requested positioning method is supported by a network associated with the radio network node.

40. The method of claim 22, wherein verifying the parameters further comprises determining if a pre-defined condition as follows is met:
   the UE supports inter-frequency positioning measurements or the UE requires measurement gaps for inter-frequency measurements.

41. The method of claim 22, wherein verifying the parameters further comprises determining if a pre-defined condition as follows is met:
   at least a threshold number of the indicated frequency(s) are non-serving frequency(s).

42. The method of claim 22, wherein verifying the parameters further comprises determining if a pre-defined condition as follows is met:
   at least a threshold number of the indicated frequency(s) are supported by at least one of the UE, a network and potential neighboring radio network nodes.

43. A radio network node for configuring a measurement gap for positioning to be used by a user equipment (UE), the radio network node comprising:
   a memory configured to store processor-executable instructions; and
   a processor configured to interface with the memory and, by executing the processor-executable instructions, to:
      receive an indication from the UE indicating that the UE needs measurement gaps for positioning;
      verify parameters in the indication to determine if one or more pre-defined conditions are met to indicate that the UE is able to perform inter-frequency positioning measurements;
      decide whether to configure the measurement gaps, wherein one or more parameters used to decide whether to configure the measurement gaps or not are received by the radio network node by one or more mechanisms as follows:
         from another radio network node;
         from another network node comprising an Operations & Maintenance (O&M) core network node, a self organizing network (SON), a minimization of drive test (MDT) node or a positioning node;
         from UE;
         by packet sniffing; and
         in a UE capability message;
      in response to deciding to configure the measurement gaps, determine a measurement gap configuration and send the measurement gap configuration to the UE; and
   wherein the memory and processor are components of the radio network node.

44. A radio network node for configuring a measurement gap for positioning to be used by a user equipment (UE), the radio network node comprising:
   a memory configured to store processor-executable instructions; and
   a processor configured to interface with the memory and, by executing the processor-executable instructions, to:
      receive an indication from the UE indicating that the UE needs measurement gaps for positioning;
      verify parameters in the indication to determine if one or more pre-defined conditions are met to indicate that the UE is able to perform inter-frequency positioning measurements;
      decide whether to configure the measurement gaps;
      in response to deciding to configure the measurement gaps, (1) determine a measurement gap configuration with an offset which is different than a requested offset in the indication, and (2) send the measurement gap configuration to the UE; and
   wherein the memory and processor are components of the radio network node.

45. The radio network node of claim 44, wherein the offset of the determined measurement gap configuration is different than the requested offset in the indication but does not differ by more than 6 subframes.

* * * * *